United States Patent
Santinelli (12)

(10) Patent No.: US 11,526,026 B1
(45) Date of Patent: Dec. 13, 2022

(54) RIMLESS EYE WEAR

(71) Applicant: Joseph Santinelli, Melville, NY (US)

(72) Inventor: Joseph Santinelli, Melville, NY (US)

(*) Notice: Subject to any disclaimer, the term of this patent is extended or adjusted under 35 U.S.C. 154(b) by 0 days.

(21) Appl. No.: 17/359,583

(22) Filed: Jun. 27, 2021

Related U.S. Application Data (60) Provisional application No. 63/044,702, filed on Jun. 26, 2020.

(51) Int. Cl.
*G02C 1/04* (2006.01)
*G02C 1/00* (2006.01)
*G02C 5/10* (2006.01)

(52) U.S. Cl.
CPC ............. *G02C 1/04* (2013.01); *G02C 1/10* (2013.01); *G02C 5/10* (2013.01); *G02C 2200/16* (2013.01)

(58) Field of Classification Search
CPC ... G02C 1/04; G02C 5/12; G02C 1/10; G02C 5/00; G02C 2200/16; G02C 1/00; G02C 5/10; G02C 5/02

USPC ........ 351/103, 106, 107, 108, 109, 104, 105
See application file for complete search history.

(56) References Cited

U.S. PATENT DOCUMENTS

| | | | |
|---|---|---|---|
| 2,384,867 A | 9/1945 | Williams | |
| 4,427,271 A | 1/1984 | Fogg | |
| 7,329,000 B2 * | 2/2008 | Actis-Datta | G02C 1/00 351/103 |
| 10,112,846 B2 | 7/2018 | Santinelli | |
| 10,254,561 B1 | 4/2019 | Santinelli | |
| 2003/0123022 A1 | 7/2003 | Mulvey | |
| 2007/0216855 A1 | 9/2007 | Tabacchi | |
| 2008/0186445 A1 * | 8/2008 | Van Atta | G02C 1/04 351/103 |
| 2010/0085533 A1 * | 4/2010 | Calilung | G02C 1/08 351/140 |

* cited by examiner

*Primary Examiner* — Marin Pichler
(74) *Attorney, Agent, or Firm* — Law Office of Carl Giordano, PC (57) ABSTRACT

An eyewear comprising a frame and a lens configuration is disclosed, wherein the frame includes a channel into which a step bevel formed along an edge of the lens removably insertable, wherein the frame includes a plurality of protrusions that contact ends of the step bevel to retain the lens within the frame.

6 Claims, 8 Drawing Sheets

RIMLESS EYE WEAR

CLAIM OF PRIORITY

This application claims, pursuant to 35 USC 119, priority to and the benefit of the earlier filing date of U.S. Provisional Application Ser. No. 63/044,702, filed on Jun. 26, 2020, the contents of which are incorporated by reference, herein.

FIELD OF THE INVENTION

The application relates to the field of eyewear and eyeglasses and specifically with regard to a rimless eye wear.

BACKGROUND OF THE INVENTION

The manufacture of present day semi-frame rimless eyewear is expensive and there are a number of known problems with this type of eye wear. For example, one type of rimless eyewear is a nylon rimless, semi-frame eyewear, wherein a lens is held into a top portion of a flexible material frame by a nylon string inserted in a bottom groove of the lens. However, there many issues involved is this type of design. For example, it is known that a lens may pop out and without the required machines it is extremely difficult to re-insert the lens. Another issue is that undue pressure on the lens causes aberration and loss of vision.

Another rimless eyewear today is referred to as a three-piece drilled mount rimless concept. However, all optical practitioners are aware of the limitations of this type of lens that present endless issues. For example, drilled lenses compromise the infrastructure of the lenses, and applying pressure such as stress and distortion on the lenses distort the optical properties that impedes the patient's vision. Another related issue arises when screws inserted in the lens cause cracks in the lenses in everyday use. Lastly, the screws may loosen causing lens to fall out.

Thus, there is a need for an eyewear that avoids the many negative issues arising from conventional rimless eyewear construction at a lower cost to dispense in a practical way and offer quality good looking rimless eyewear to the general public.

SUMMARY OF THE INVENTION

It is an object of the present invention to create semi-frame eyewear in a simpler and less expensive manner. The present invention refers to an e eyewear comprising a frame and a pair of lens that may snap into the frame and held in place along the edge of the lens.

In one aspect of the invention, the lens may be formed or machined to contain an extension member (a step bevel) that engages a corresponding containing member within the frame. In one aspect of the invention, the formation (i.e., extension member, engagement member) in the lens may, for example, be formed by selectively removing material from the lens along a portion of the lens to create the step bevel. The step bevel may further be used to lock the lens in place. In one aspect of the invention, a frame may be created with a slot extending substantially a length of the frame in which a soft material, e.g., a rubber, silicon or polymer, that may facilitate the containment of the extension member within the slot and further compensate for any tolerance errors in the formation of the slot or the lens extension member.

In one aspect of the invention, an eyewear comprising a frame including a left section and a right section connected to a bridge section is disclosed. Within each of the left section and the right section is a slot or channel into which a designated portion of a corresponding lens may be placed. Each of the corresponding lens further incorporates a step bevel along an edge and partially along a right and left edge of the lens. Attachment points on the frame engage the ends of the step bevel to retain the lens in place.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings, which are not drawing to scale, making apparent to those skilled in the art how the several forms of the invention may be embodied in practice and the drawings are not drawn to scale. In the accompanying drawings.

It is noted that the drawings of the invention are not to scale. The drawings are intended to depict only typical aspects of the invention, and therefore should not be considered as limiting the scope of the invention. In the 8 drawings, like numbering represents similar or like elements between the drawings.

It is to be understood that the figures and descriptions of the present invention described herein have been simplified to illustrate the elements that are relevant for a clear understanding of the present invention, while eliminating, for purposes of clarity, many other elements. However, because these elements are well-known in the art, and because they do not facilitate a better understanding of the present invention, a discussion of such element is not provided herein. The disclosure herein is directed also to variations and modifications known to those skilled in the art.

DETAILED DESCRIPTION OF THE PRESENT INVENTION

Figure 1:
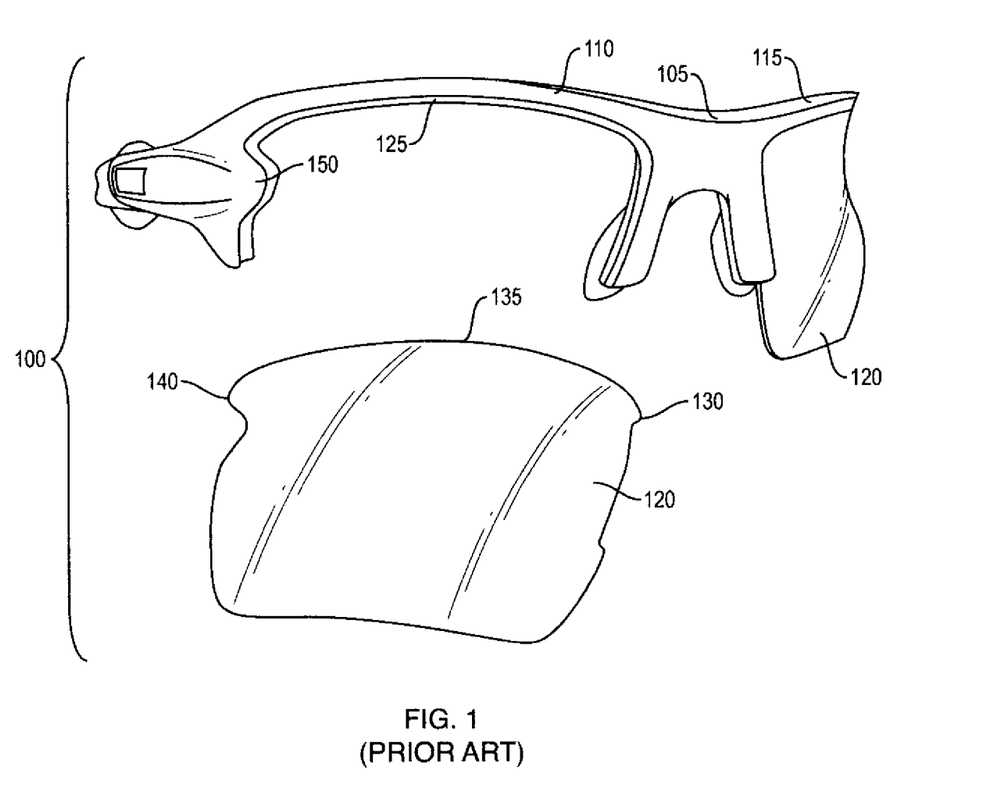
FIG. 1 illustrates a conventional lens configuration using a plastic lens.

FIG. 1 illustrates a conventional rimless eyewear system 100 including a frame 105 comprising a first section 110 and a second section 115, into which a lens 120 may be inserted. In this illustrated case, a first lens 120 is removed from first section 110 and a second lens 120 is inserted into second section 115.

Lens 120, which is shown separated from left section 110, includes hook 130 on one edge and an indentation 140 on a second, opposite, edge of lens 120.

When lens 120 is inserted into frame 100, a top edge 135 of lens 120 engages a channel 125 within frame 100, while hook 130 on one edge of lens 120 engages a slot (not shown) within frame 105 and indention 140 engages a protrusion 150 on frame 105.

In this conventional eyewear/lens configuration, lens 120 is composed of a plastic material of a uniform thickness that may be formed with the hook 130 and indentation 140.

However, for glass type lens the formation of hook 130 and indention 140 is not practical.

Figure 2:
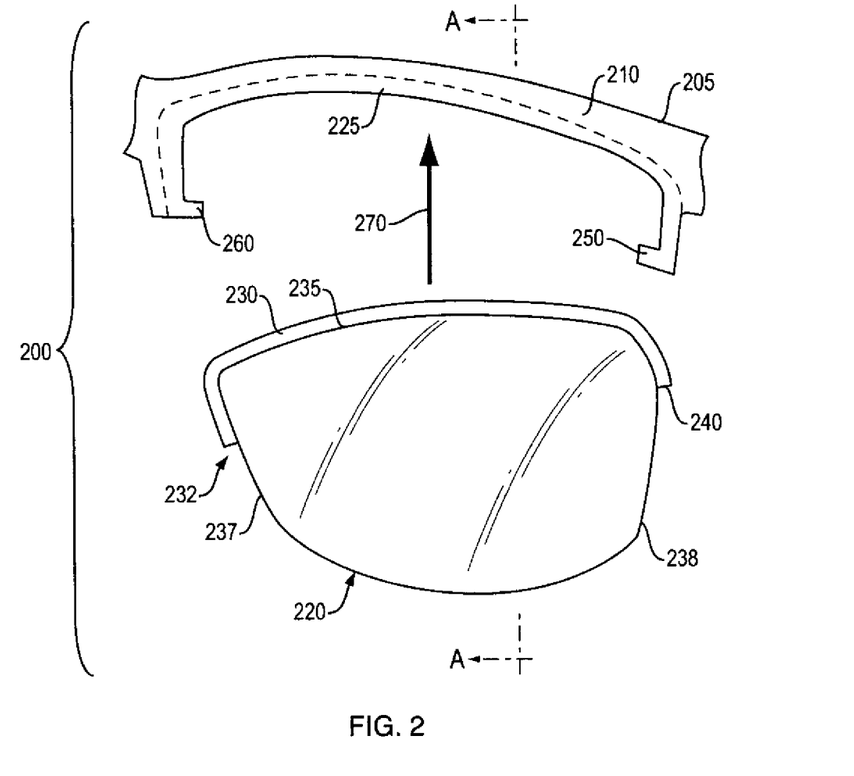
FIG. 2 illustrates an expanded front view of an exemplary eyewear section in accordance with the principles of the invention.

FIG. 2 illustrates an expanded view of an exemplary embodiment of an eyewear configuration in accordance with the principles of the invention.

In this illustrated embodiment, eyewear 200 comprises frame 205 including a left section 210 and a right section (not shown) similar to frame 105. Further illustrated is lens 220 that may be inserted into, and retained by, left section 210 of frame 205.

Each of the left section 210 and right section (not shown) of frame 205 further includes first protrusion 250 on a first side of left section 210 and a second protrusion 260 on a second, opposing, side of left section 210. Although not shown it would be recognized that the not shown right section would include similar first protrusion 250 and second protrusion 260.

Left section 210 (and right section) of frame 205 further includes slot 225 extending from first protrusion 250 to second protrusion 260.

Lens 220 includes an engagement mean 230 (hereinafter referred to as a "step bevel") that extends along a top edge 235 of lens 220 and partial along opposing edges 237, 238 of lens 220.

The partial extension of step bevel 230 partial along opposing edges 237, 238 creates ends or stops 232, 240 which form contact points that may be used to retain lens 220 within the illustrated left section 210 of frame 205.

In accordance with the principles of the invention, engagement means (i.e., step bevel) 230 may be inserted into slot 225, while protrusion 260 engages contact end point 232 and protrusion 250 engages contact end point (or edge of step bevel) 240.

The attachment of lens 220 into slot 225 is performed by the insertion of lens 220, as represented by arrow 270, wherein the three (3) points of contact (i.e., along the top edge and each of the edges of step bevel 230) retain lens 220 in place.

Figure 3:
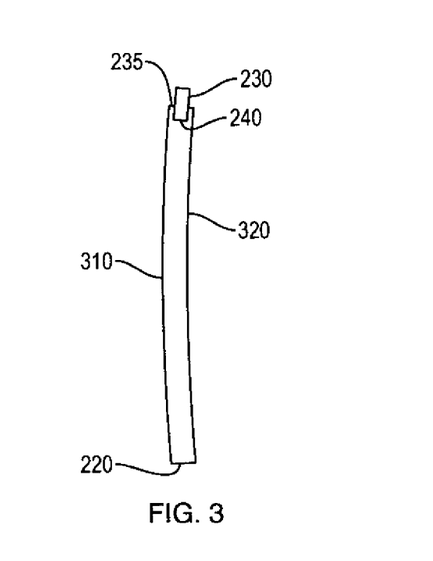
FIG. 3 illustrates a cross-sectional view, through section A-A, of the exemplary lens configuration shown in FIG. 2.

FIG. 3 illustrate a side view, along axis A-A shown in FIG. 2, of lens 220. In this illustrative view, step bevel 230 is shown extending from a top edge 235 of lens 220 and having a thinner, or narrower, profile than lens 220. In accordance with the principles of the invention, the step bevel 230 may be formed by removing material from lens 220 using known techniques. For example, lens 220 may be etched, by routing material from surface 310 and opposing surface 320.

Figure 4:
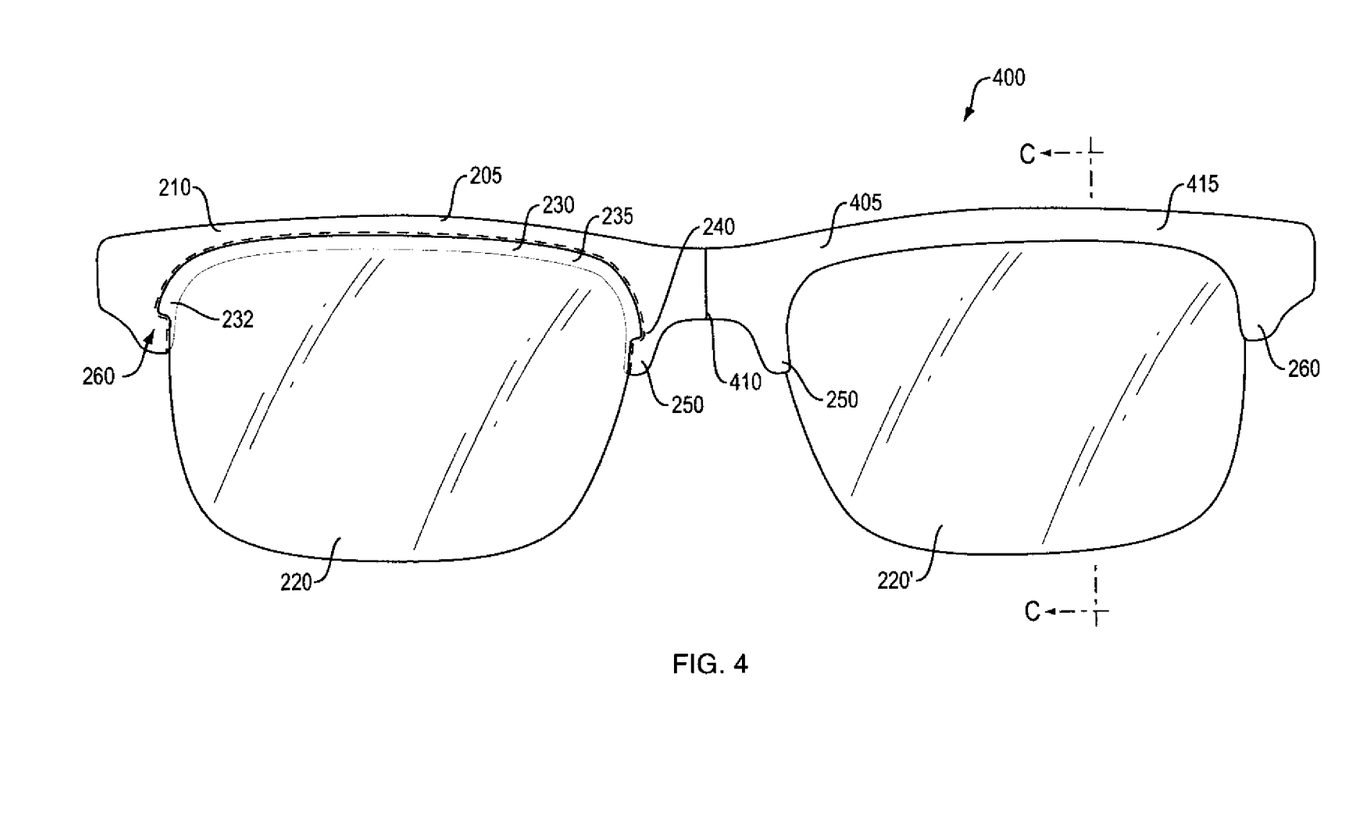
FIG. 4 illustrates a front view of an exemplary eyewear in accordance with the principles of the invention.

FIG. 4 illustrates an exemplary eyeglass 400 comprising a frame 405 and lenses 220, wherein frame 405 comprises first section 210 and second section 415 joined together by bridge element 410. First section 210 is shown retaining lens 220 and second section 415 is shown retaining lens 220' (which is identical to lens 220).

In this illustrated example, second section 415 is shown in a completed from, where lens 220' is inserted into second section 415 by the three-point contacts of slot 225 and protrusions 250, 260. Whereas first section 210 is shown as a transparent element to show the insertion of step bevel 230 of lens 220 into slot 225 of left section 210

Figure 5:
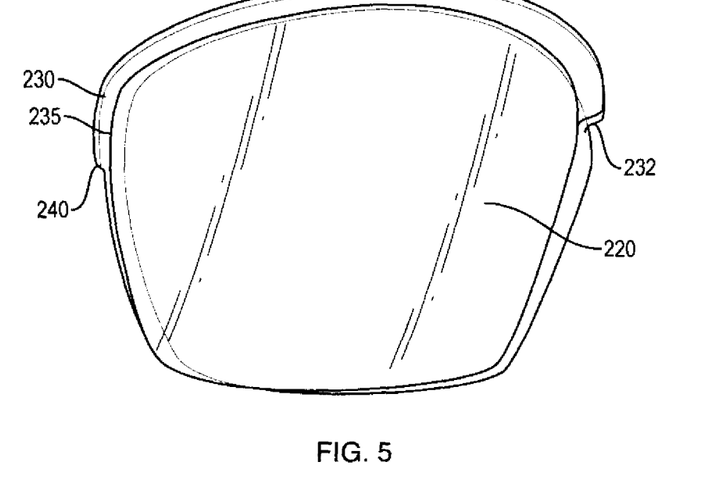
FIG. 5 illustrates a rear view of an exemplary lens configuration in accordance with the principles of the invention.

FIG. 5 illustrates a rear view of lens 220 (i.e., surface 320 facing the viewer) in accordance with the principles of the invention, wherein step bevel 230 extends along the top edge 235 of lens 220 from a first end contact point 240 to a second end contact point 232. Further illustrated is the curved form of lens 220.

Figure 6:
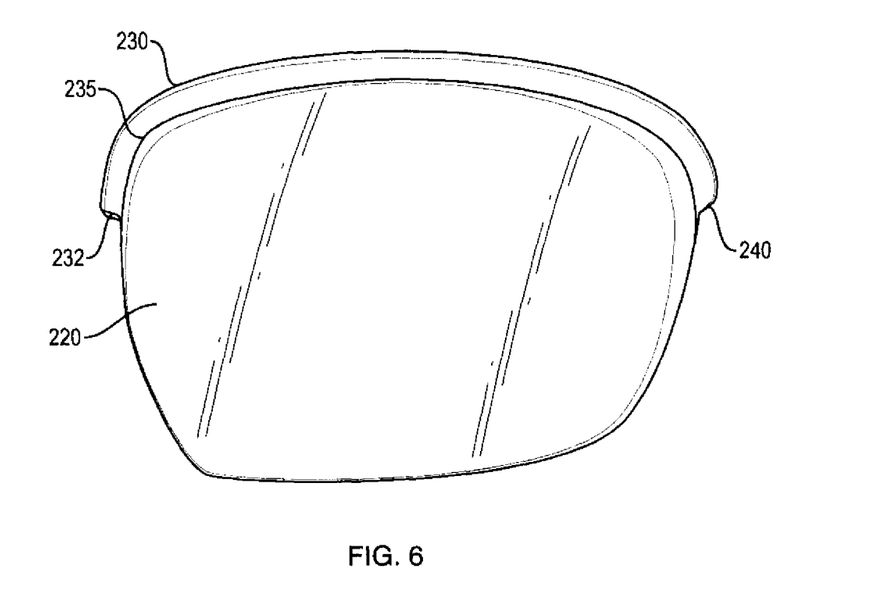
FIG. 6 illustrates a front view of lens of the exemplary lens configuration.

FIG. 6 illustrates a front view of lens 220 (i.e., surface 310 facing the viewer) showing step bevel 230 extending along top edge 235 of lens 220.

Figure 7:
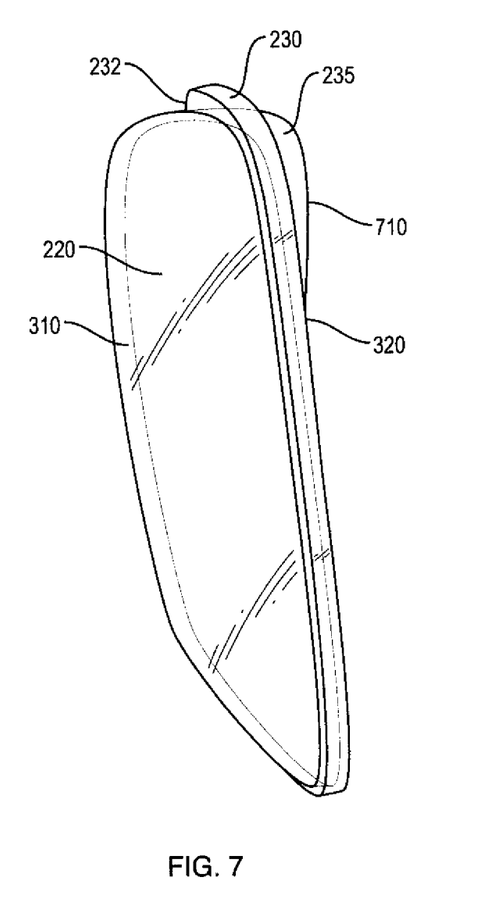
FIG. 7 Illustrates a top view of an exemplary lens configuration.

FIG. 7 illustrates a top view of lens 220 comprising a step bevel 235 extending from top surface 230. Further illustrated is the curvature 710 along the rear surface 320 of lens 220. In this case, lens 220 represents a prescriptive lens that may be prepared for a user to correct deficiencies of the user's eyesight.

In this illustrated embodiment, the step bevel 230 follows along the curvature of the front surface 310 of lens 220.

Figure 8:
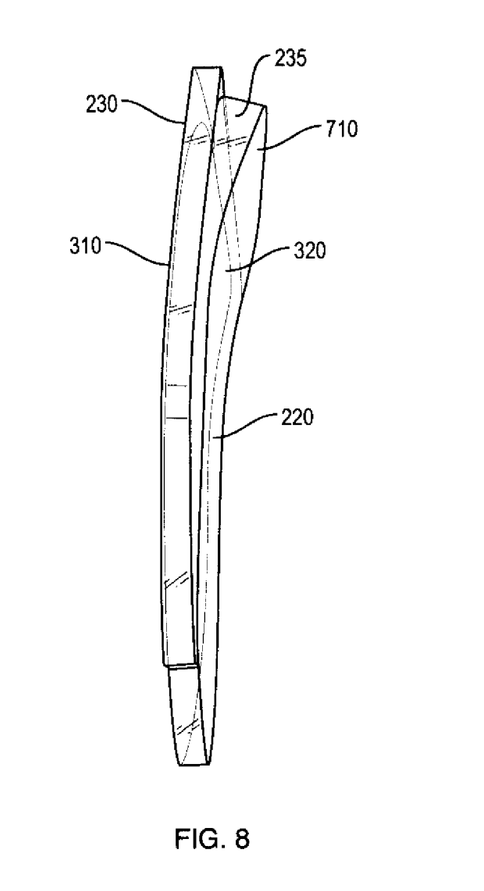
FIG. 8 illustrates second top view of an exemplary lens configuration.

FIG. 8 illustrates a second top view of lens 220 illustrating the orientation of step bevel 230 with respect to top edge 235 and curvature 710.

Figure 9:
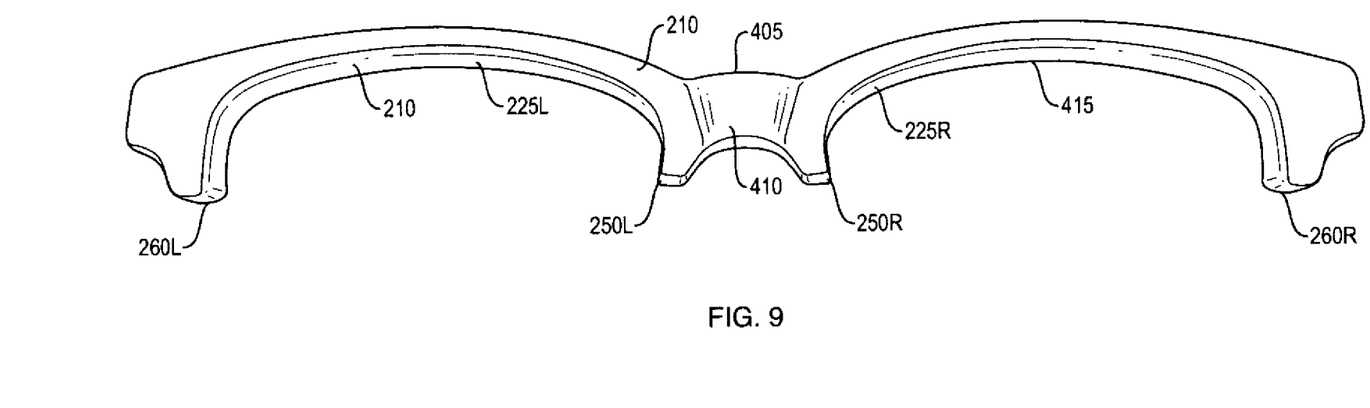
FIG. 9 illustrates an embodiment of an exemplary eyewear frame.

FIG. 9 illustrates an embodiment of an exemplary eyewear frame 405.

In this exemplary embodiment, frame 405 comprises a left section 210 and a right section 415, joined together by bridge section 410. Further illustrated are protrusions or tabs 250L and 260L associated with left section 210 and tabs 250R and 260R associated with right section 415. Protrusions or tabs 250L, 260L, 250R and 260R, engage and retain correspond left lens 220 and right lens 220' in place.

Further illustrated is slot 225L in left section 210 and slot 225R in right section 415.

Figure 10:
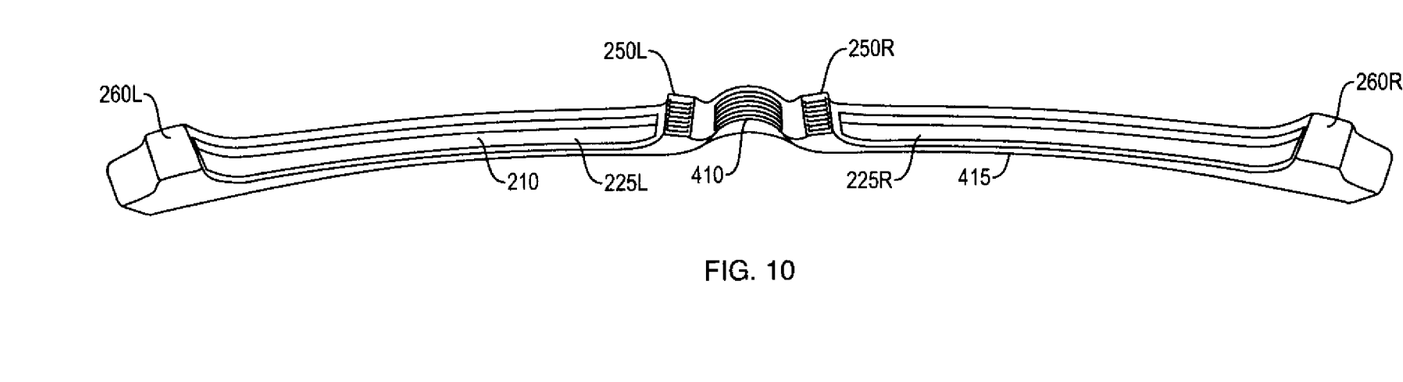
FIG. 10 illustrates a bottom view of the exemplary eyewear frame shown in FIG. 9.

FIG. 10 illustrates a bottom view of the exemplary eyewear frame 405 shown in FIG. 9.

As illustrated, left section 210 includes a slot 225L and second section 415 includes a slot 225R. Slots 225L and 225R presented as a channel extending from protrusions 250 to 260, as discussed.

Channels 225L and 225R are configured to engage step bevel element 230 of corresponding lens 220 (220') while protrusions 250 and 260 capture the end contact points associated with step bevel 230. In one aspect of the invention, channels 225L and 225R may include a flexible material that provides for the further retention of lens 220 (220') when inserted into channels 225L and 225R and for a reduction of stress between the frame and the lens.

Figure 11A:
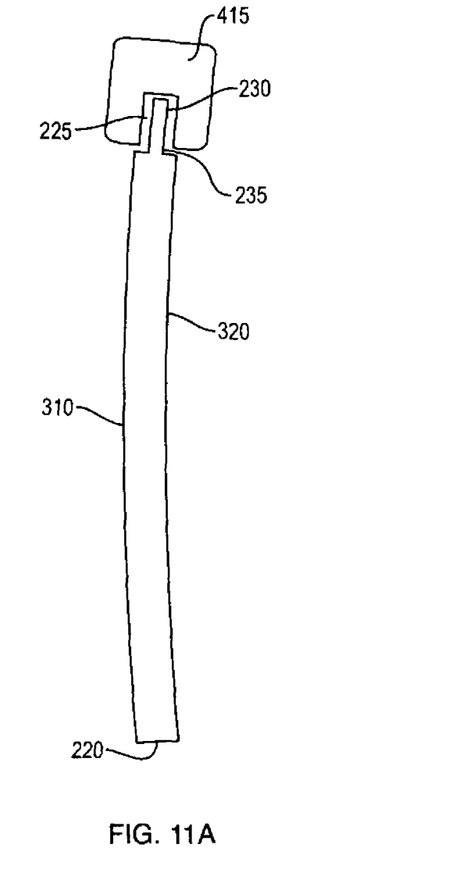
FIG. 11A illustrates a cross-sectional view, through section C-C of FIG. 4, showing a first exemplary embodiment of a frame configuration.

FIG. 11A illustrates a cross-sectional view, through section C-C of FIG. 4, showing a first exemplary embodiment of right section 415 of frame 405 including slot (channel) 225 and step bevel 230, in accordance with the principles of the invention.

In this illustrated first embodiment right section 415 comprises slot 225 into which step bevel 230 may be inserted. Although not shown it would be recognized that lens 220 is further be retained in place by protrusions 250 and 260 (not shown) engaging end contacts 240, 232 of step bevel 230.

Figure 11B:
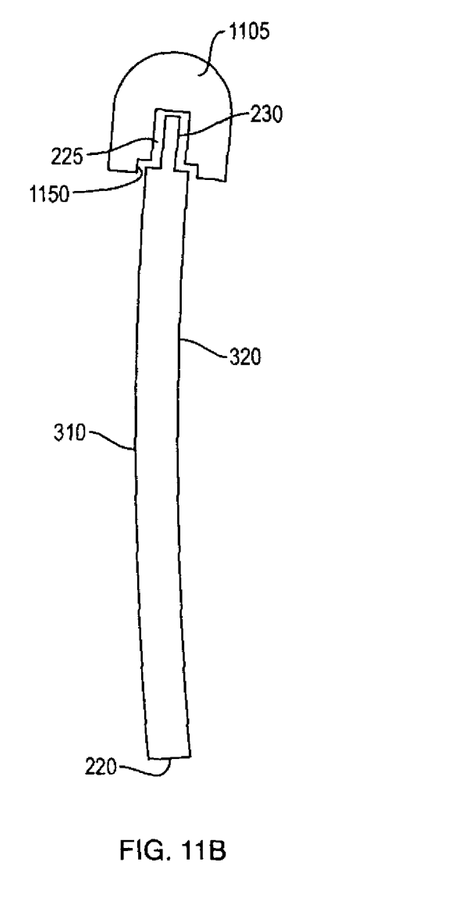
FIG. 11B illustrates a cross-sectional view, through section C-C of FIG. 4, showing a second exemplary embodiment of a frame configuration.

FIG. 11B illustrates a cross-sectional view, through section C-C of FIG. 4, showing a second exemplary embodiment of frame 415 containing slot 235 into which step bevel 230 may be inserted.

In this illustrated second embodiment frame 415 (referred to as 1105) comprises a first slot 225 and a second slot 1150, wherein first channel 225 is positioned substantially centered within second slot 1150.

In this second exemplary embodiment, step bevel 230 engages slot 225, as previously discussed, and second slot 1150 is sized to capture top edge 235 of lens 220.

The use of second slot (or channel) 1150 provides further stability to lens 220 within frame 1105.

Figure 12:
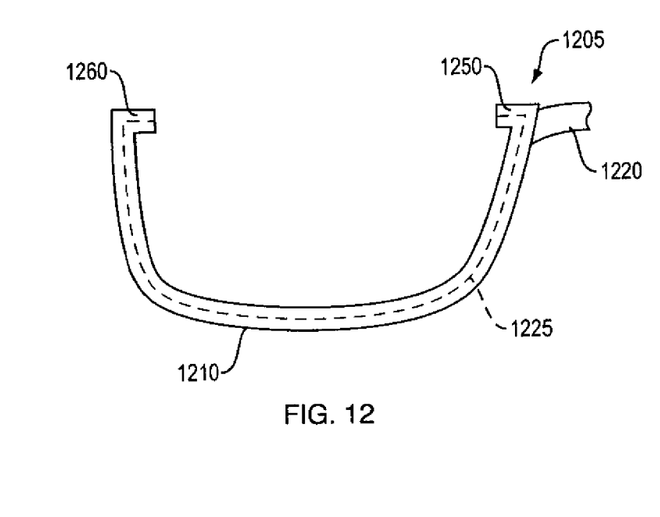
FIG. 12 illustrates a front view of a second exemplary embodiment of a frame configuration in accordance with the principles of the invention.

FIG. 12 illustrates a front view of a second exemplary embodiment of a frame 1205 configuration in accordance with the principles of the invention.

In this illustrated embodiment, frame 1205 comprises first section 1210 and second section (not shown) connected by a bridge element 1220, similar to that disclosed with regard to FIG. 4.

Further illustrated and withing first section 1210 (and not shown second section) is slot or channel 1225. Slot or channel 1225 is configured to capture a lower edge of lens 220 (not shown) in a manner discussed previously with regard slot 225. See for example FIGS. 10A and 10B.

Further illustrated are protrusions (or tabs) 1250 and 1260 extending from a free end of first section 1210. Protrusions 1250 and 1260, similar to protrusions 250, 260 capture edges of step bevel (not show) formed within the not shown lens.

Figure 13:
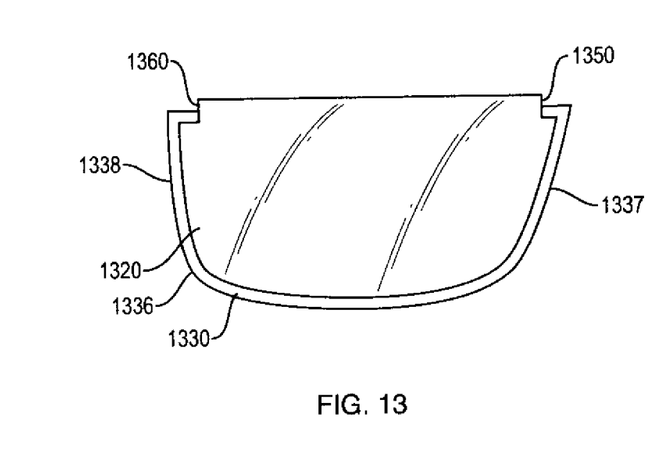
FIG. 13 illustrates an exemplary lens configured to be insertable into the second exemplary embodiment of the frame configuration shown in FIG. 12.

FIG. 13 illustrates an exemplary lens configured to be insertable into the exemplary frame configuration shown in FIG. 12.

In this illustrated case, lens 1320 includes an engagement means (step bevel) 1330 formed along a bottom edge 1336 of lens 1320. Step bevel 1230 is similar to construction to step bevel 230 disclosed.

Further illustrated are indentations 1350 on edge 1337 of lens 1320 and indentation 1360 on edge 1338 of lens 1330.

In accordance with the principles of the invention, step bevel 1330 may be inserted into slot 1225 (FIG. 12) to capture lens 1330 as protrusions 1250 and 1260 engage corresponding ones of indentations 1350 and 1360 to retain lens 1320 tightly in position.

Figure 14:
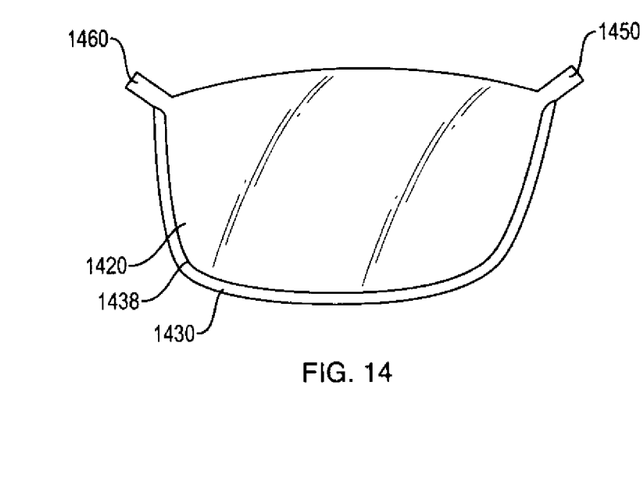
FIG. 14 illustrates a second exemplary lens configuration in accordance with the second exemplary embodiment of the frame configuration shown in FIG. 12.

FIG. 14 illustrates a second exemplary lens configuration in accordance with this second exemplary embodiment of the frame configuration shown in FIG. 12.

In this second exemplary lens configuration, lens 1420 includes step bevel 1430 extending along a lower edge 1438 of lens 1420. Further illustrated are extension tabs 1450, 1460, on opposing edges of lens 1420.

In accordance with this aspect of the invention, step bevel 1430 may be inserted into slot 1225 of left section 1210 of frame 1205 while extension tabs 1450 and 1460 may be inserted into slot 1225 within protrusions 1250 and 1260, respectively. Accordingly, lens 1420 is held tightly in place with the three-point contact system disclosed, herein.

To summarize the principles of the invention, the invention describe herein is an eyewear comprising a frame comprising a first section and a second section joined together by a bridge element, the bridge element including a nose element extending downward therefrom, each of the first section and the second section including a slot therein and a lens associated with each of the first section and the second section, each lens comprising a main portion and step bevel extending along an edge of the lens and extending partially along opposing edges of the lens, wherein the step bevel has a decreased width compared to a main body of the lens.

In addition, the frame includes protrusions that engage edges of the step bevel extending along the opposing edges of the lens to retain the lens within the frame.

Although the invention has been described with regard to preferred embodiments of the invention claimed, it is expressly intended that all combinations of those elements that perform substantially the same function in substantially the same way to achieve the same results are within the scope of the invention. Substitutions of elements from one described embodiment to another are also fully intended and contemplated.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

What is claimed is:

1. An eyewear comprising:
 frame, said frame comprising:
  a left section forming a left first end and a left second end, said left section comprising:
   a left first protrusion extending from said left first end; and
   a left second protrusion extending from said left second end; and
   a left slot extending from said left first protrusion to said left second protrusion;
   a right section forming a right first end and a right second end, said right section comprising:
   a right first protrusion extending from said right first end; and
   a right second protrusion extending from said right second end; and
   a right slot extending from said right first protrusion to said right second protrusion; and
  a bridge element connecting said left first end and said right first end; and a lens incorporated to each of said left section and said right section, said lens comprising:
  a lens body comprising:
    a front surface; and
    a back surface, wherein a distance between said front surface and said back surface representing a known width; and
    a step bevel, narrower in width than said known width of said lens body, extending along an edge of said lens body from a first side of said lens body to a second side of said lens body, wherein said step bevel is configured to:
  engage a corresponding one of said left slot and said right slot to retain said lens in position within said left section and said right section.

2. The eyewear of claim 1, wherein said step bevel is configured to:
  extend along a top edge of said lens body.

3. The eyewear of claim 1, wherein said step bevel is configured to:
  extend along a bottom edge of said lens body.

4. The eyewear of claim 1, wherein said lens is one of: clear and tinted.

5. The eyewear of claim 1, comprising:
  a second slot within each of said left slot and said right slot, said second slot sized to accommodate said edge of a corresponding lens.

6. The eyewear of claim 1, comprising a flexible material within each of said first slot and said second slot.

* * * * *